Feb. 23, 1954  C. W. STRAUBEL  2,669,994
FRONT LEAF CONTROL FOR TILTING FRONT FILING DRAWERS
Filed April 11, 1951  5 Sheets-Sheet 2
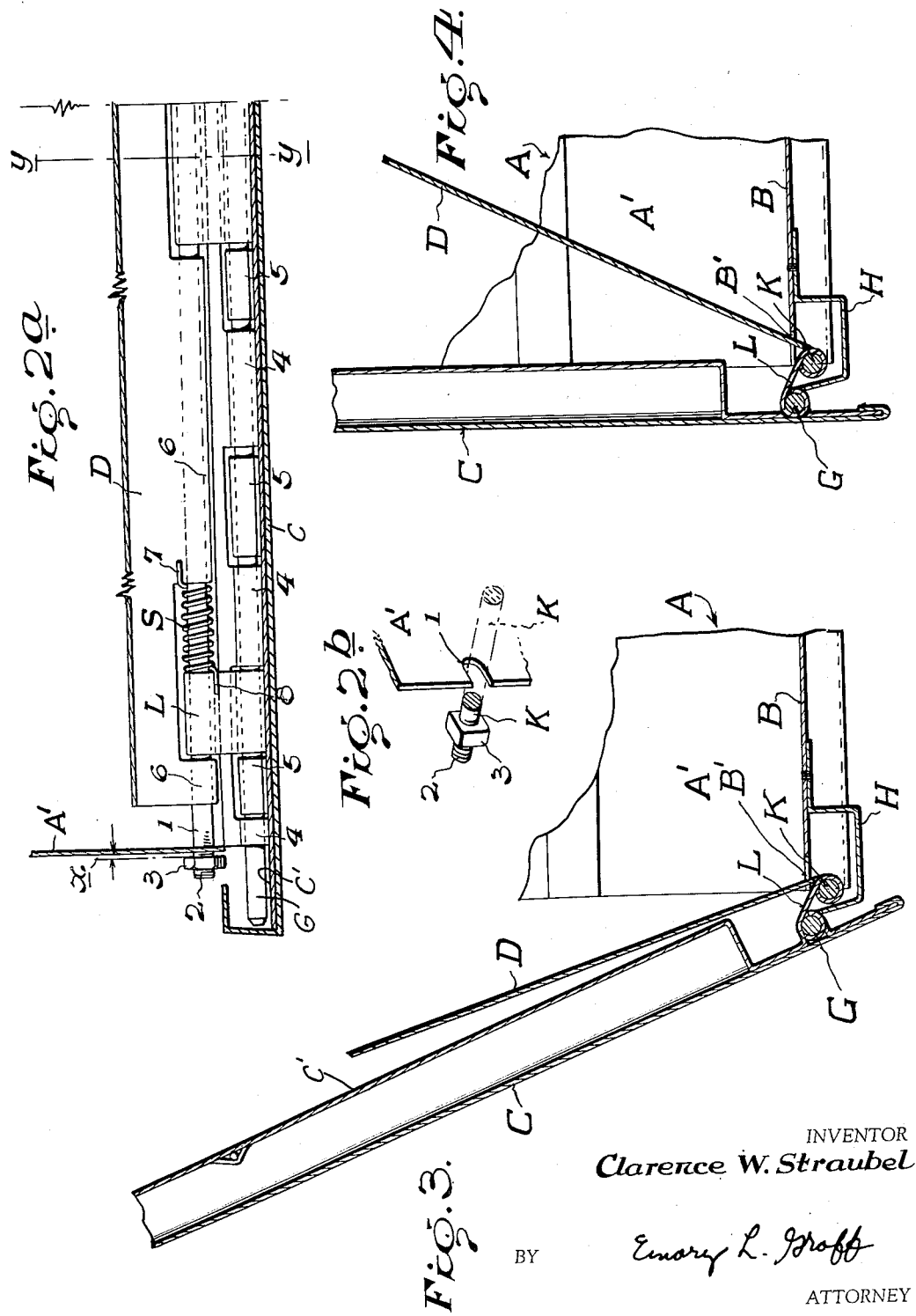
INVENTOR
Clarence W. Straubel.
BY Emory L. Groff
ATTORNEY Feb. 23, 1954 C. W. STRAUBEL 2,669,994
FRONT LEAF CONTROL FOR TILTING FRONT FILING DRAWERS
Filed April 11, 1951 5 Sheets-Sheet 3
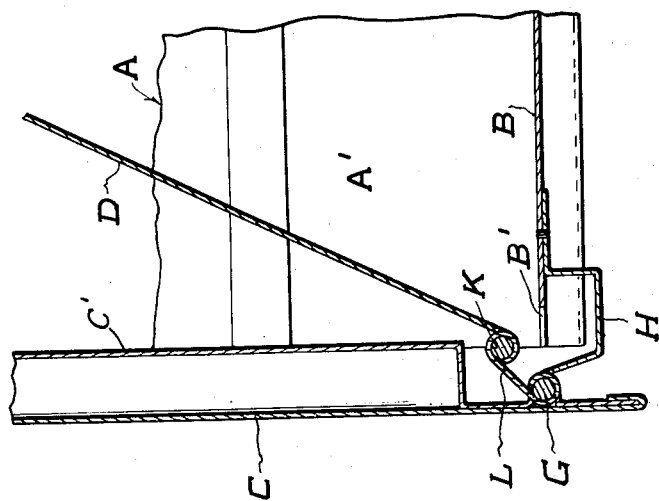
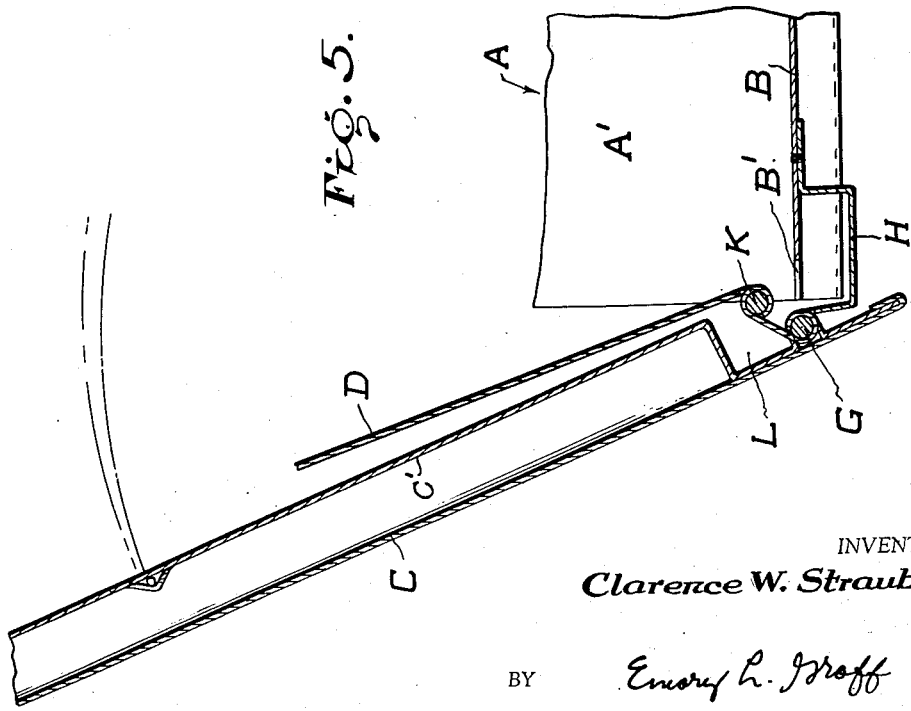
INVENTOR
Clarence W. Straubel.
BY Emory L. Groff
ATTORNEY

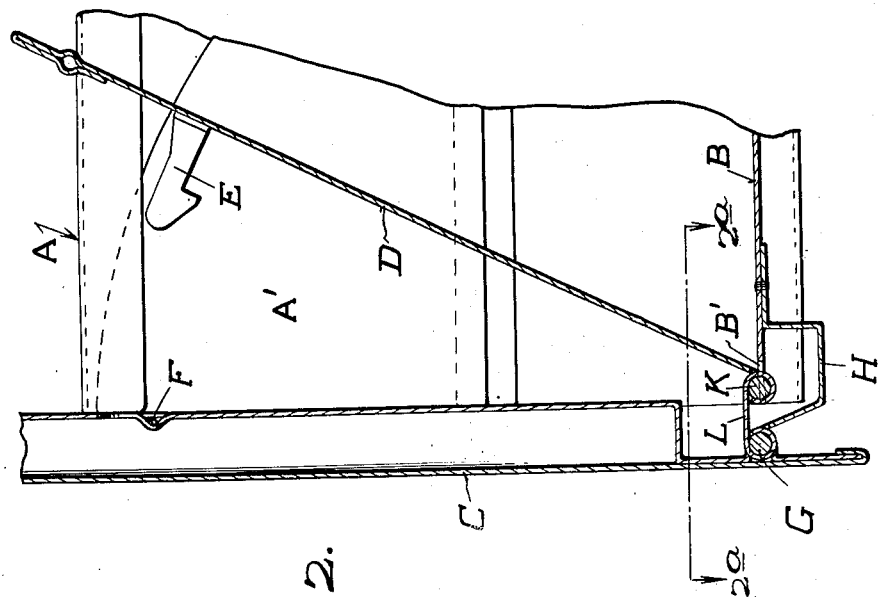
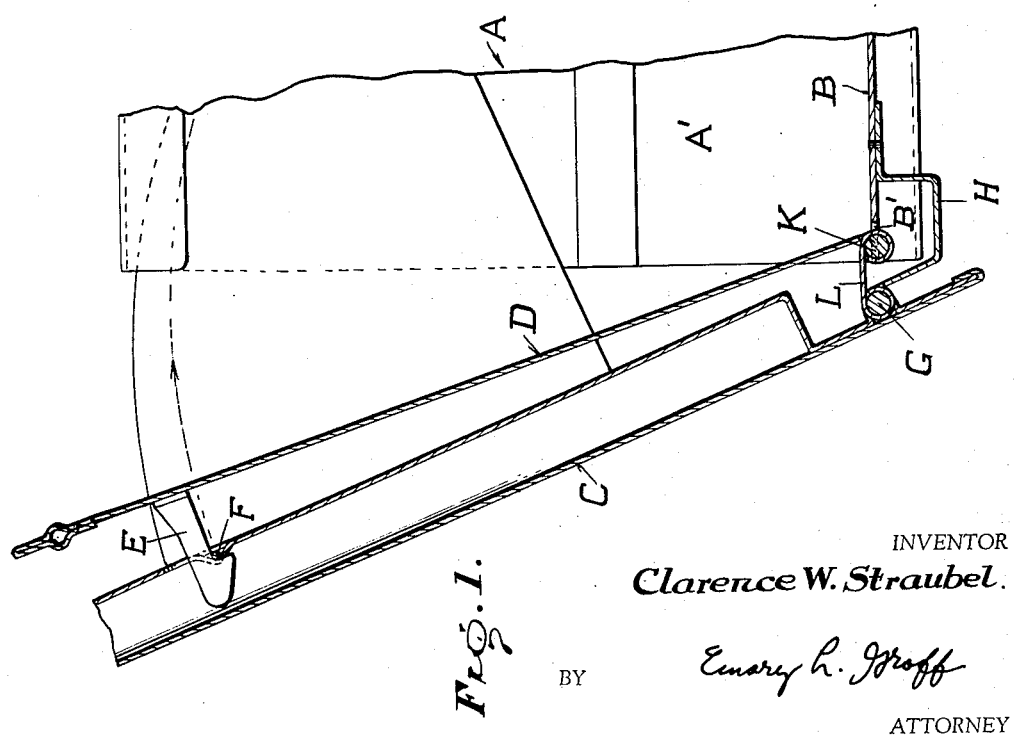

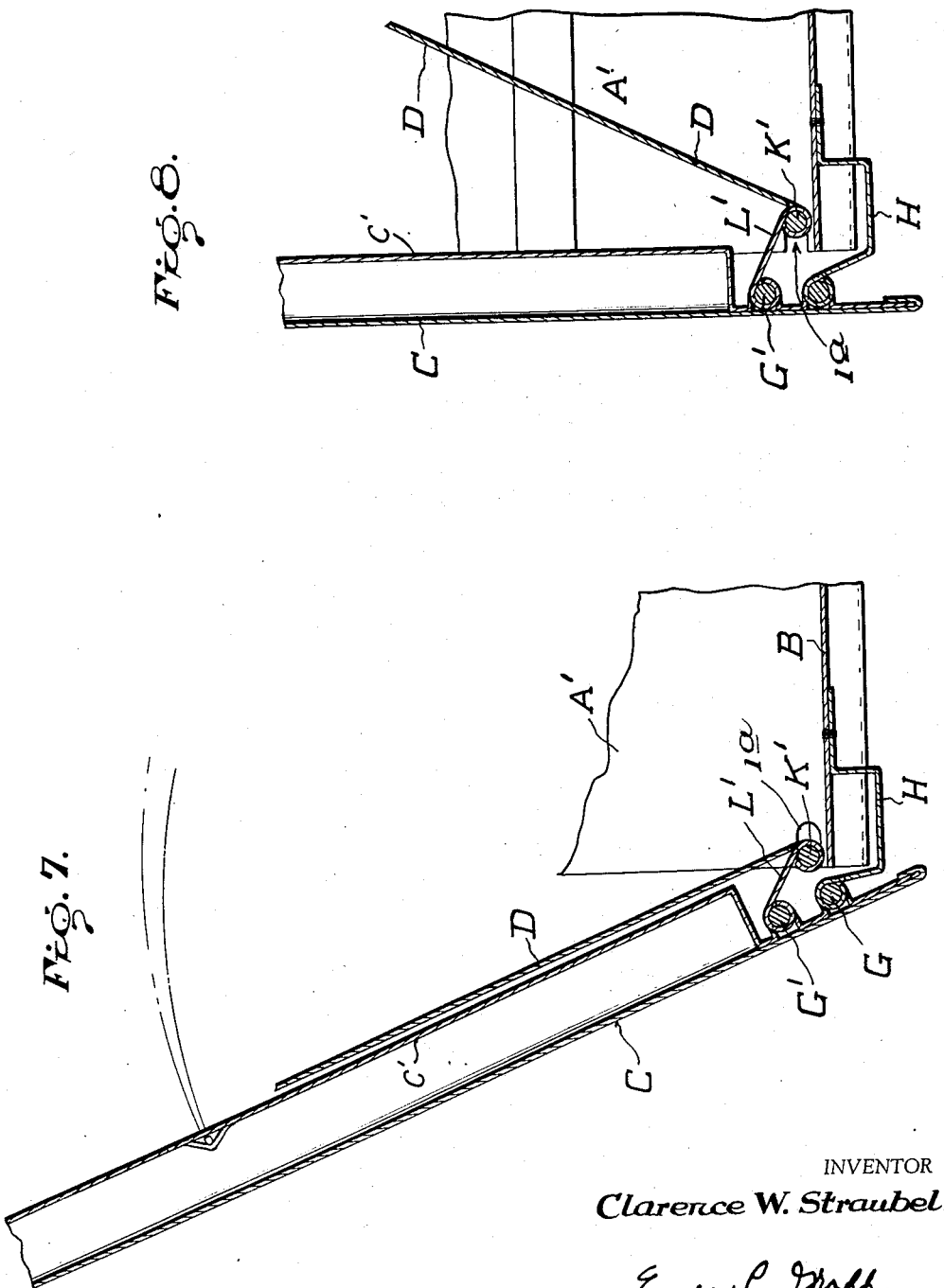

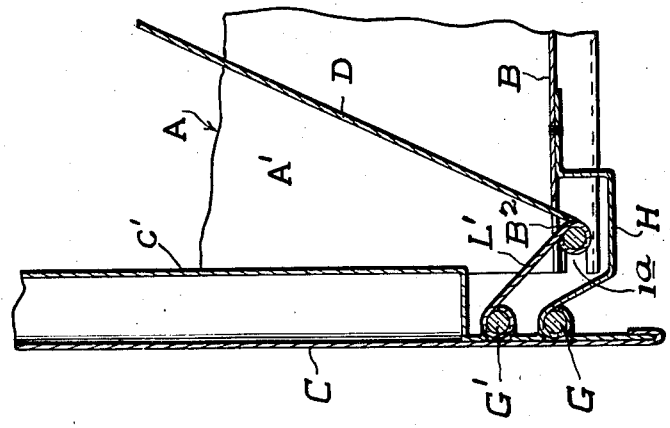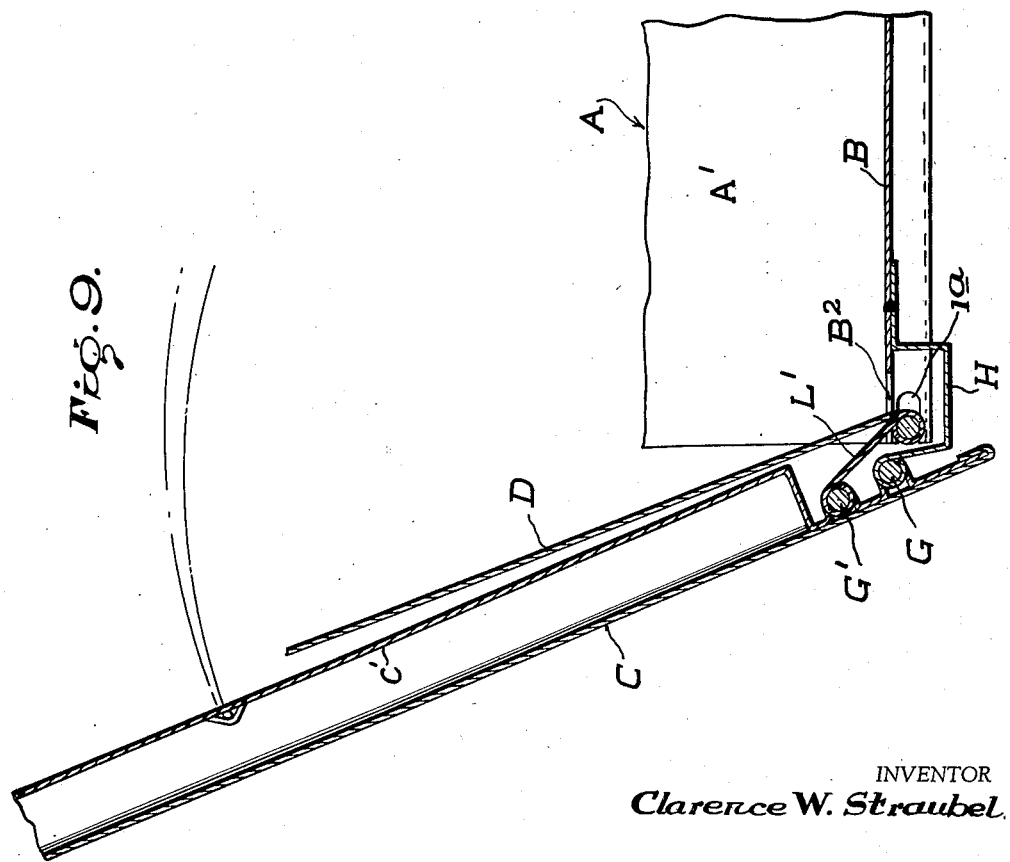

Patented Feb. 23, 1954

2,669,994

UNITED STATES PATENT OFFICE 2,669,994

FRONT LEAF CONTROL FOR TILTING FRONT FILING DRAWERS

Clarence W. Straubel, Youngstown, Ohio, assignor to The General Fireproofing Company, Youngstown, Ohio, a corporation of Ohio Application April 11, 1951, Serial No. 220,441

7 Claims. (Cl. 129—26)

1

This invention relates to an improvement in front compressor leaf control means for tilting front drawers for filing cabinets, such for example as shown in Straubel Patent 2,090,647 issued August 24, 1937.

One of the objects of the invention is to mount the front compressor leaf or plate on the drawer body instead of on the tilting front and yet preserve the feature of manually latching the front plate to the front when the latter is open and causing the plate to automatically close when the tilting front is closed.

Another object of the invention is to connect the pivot shaft for the front plate to the tilting front by links which hold the said pivot shaft assembled to the drawer sides. This may be accomplished by connecting the outer ends of the links with the tilting front either at the location of the axis of the said tilting front or eccentrically to said axis. Said links also provide a bearing for one end of the front leaf control spring.

A further object is to provide a construction whereby the pivot shaft for the front plates is slidably mounted in the drawer sides to move the same inwardly of the drawer to further augment the compressive effect of the control spring.

With the above and other objects in view which will more readily appear as the nature of the invention is better understood, the same consists in the novel construction, combination, and arrangement of parts hereinafter more fully described and claimed.

A preferred and practical embodiment of the invention is shown in the accompanying drawings, in which:

Figure 1 is a vertical sectional view showing the tilting front open and the compressor plate latched thereto.

Figure 2 is a view similar to Figure 1 illustrating the position of parts when the tilting front is closed.

Figure 2a is a horizontal sectional view taken on the line 2a—2a of Figure 2.

Figure 2b is a detail perspective view illustrating one of the notches in one of the side walls of the drawer and the relation of the pivot shaft for the compressor plate, thereto.

Figure 3 is a vertical sectional view of a modification of the invention shown in Figure 1, showing the tilting front open and the compressor plate in latched position.

Figure 4 is a view similar to Figure 3 with the tilting front closed.

Figure 5 is a vertical sectional view of another modification of the invention shown in Figure 1, the tilting front being open, and the compressor plate shown in latched position.

Figure 6 is a view similar to Figure 5 with the tilting front closed

2

Figure 7 is a vertical sectional view of a further modification showing the tilting front open and the compressor plate in latched position.

Figure 8 is a view similar to Figure 7 with the tilting front closed.

Figure 9 is a vertical sectional view of a still further modification showing the tilting front open and the compressor plate in latched position.

Figure 10 is a view similar to Figure 9 with the tilting front closed.

Similar reference characters designate similar parts throughout the drawings.

The present construction carries forward the general features and operation of the patent referred to in the particular that the front compressor may be latched to the tilting front when the latter is open and automatically released when the tilting front is closed, but departs structurally therefrom in the respect that the compressor leaf is not pivotally carried by the tilting front but is mounted on a pivot shaft supported in the drawer body and held in spaced relation to the pivot shaft of the tilting front by a series of links. According to one form of the invention the links connect the two shafts to maintain the axes thereof in fixed relation, while in another form the links are connected to the pivot shaft for the compressor leaf and another pivot shaft carried by the inner face of the tilting front which is separate from the pivot shaft for the tilting front. In this form the pivot shafts for the compressor leaf and the tilting front are slidably related which has the advantage that the compressor leaf may be brought into closer parallel relation to the inner face of the tilting front when the latter is open.

Also, the links serve as a bearing for one end of the spring which tends normally to rock the compressor leaf inwardly to drawer contents engaging position.

Referring to the drawings, the drawer is designated as A and has the usual sides A' and bottom B, while the drawer head or tilting front is designated as C, has an inner wall member C', and the compressor plate D may be manually interlocked with the tilting front by the latch E and keeper means F in the manner of the patent referred to.

The tilting front is pivotally mounted in all forms of the invention, on a hinge shaft G carried by bracket H connected to the drawer bottom B. Also, the compressor plate D is in all cases mounted on a hinge shaft K supported in the side walls A' of the drawer body and connected to the tilting front by link means which will be described more in detail with each of the several figures.

Referring first to Figures 1, 2, 2a and 2b which show the tilting front open and closed, it will be seen that the hinge shaft K for the front plate D has its opposite ends resting in notches 1 in the side walls A'—A' and the portions of the ends which project outwardly of the side walls are threaded as at 2 to receive nuts 3. The threaded portion of the shaft ends is of such length that the nuts 3 when screwed home leave a space $x$ which provides a gap providing slight axial movement of the shaft K to prevent binding of parts during operation.

As will be seen more clearly from Figure 2a the shaft G is medially supported in the hinge leaves 4 on the bracket H and hinge leaves 5 on the inner wall of the tilting front C. Between certain of the hinge leaves 4 and 5 the shaft G supports the links L whose ends opposite the shaft embrace the shaft K which supports the compressor plate D. The lower end of the compressor leaf is provided with hinge leaves 6 which embrace shaft K to permit the same to swing thereon. The leaves 6 are so spaced as to receive between them the links L and the spring S for controlling the front plate D. This spring is coiled about shaft K and has one end 7 bearing against the plate and one end 8 bearing against the link. It will of course be understood that Figure 2a only shows one half of a tilting front etc., and all of the construction just described is duplicated on the other side of center line $y$—$y$. Thus, it will now be seen that the front plate D is hingedly supported on the shaft K and is normally rocked inwardly by springs S.

Moreover since the links L are of fixed length the axes of shafts G and K are held a fixed distance apart and the shaft K is held assembled to the drawer sides by the links holding the same in the notches 1. The drawer bottom B is recessed at B' to receive the lower end of the front plate and its shaft K.

The construction of Figures 1 and 2 is repeated in Figures 3 and 4; and in Figures 5 and 6 except that the angular relation of the links L to the drawer bottom and consequently to the tilting front C and plate D, may be changed to vary the angular relation of the plate to the inner face of the tilting front to make it lie closer thereto. The angular disposition of the links L is controlled by the position or elevation of the notches 1 in the side walls of the drawer.

In Figures 1 and 2, the notches 1 are in line with the drawer bottom B; in Figures 3 and 4, they are below the drawer bottom; and in Figures 5 and 6, the notches are above the plane of the drawer bottom. In all of these cases the axes of G and K are equidistant because the lengths of the links are the same. The shafts K cannot fall out of the notches 1 for the same reason. The arrangement provides a practical form of assembly that is more advantageous than making holes rather than notches to receive the journal ends of shaft K. However, it would be obviously within the scope of the present invention to use holes instead of notches as to the forms of the invention shown in Figure 1–6.

Figures 7 and 8 of the drawing represent a modification of the invention wherein the links L' have their outer ends divorced from the shaft G and are supported eccentrically to the axes of G on the separate hinge pintle G' carried by the inner side of the tilting front C. The inner ends of the links are carried by the pivot shaft K' which in turn supports the front compressor plate D and the shaft K' is slidable in the elongated notches or guide means 1ª. Thus, the compressor effect of the front plate is augmented by the inward sliding movement thereof in addition to the effect of the springs S' which are, of course, also used as shown in Figure 2a.

In Figures 7 and 8, the notches 1ª are located above the drawer bottom, but as shown in Figures 9 and 10, the notches may be formed in the side walls A'—A' below the drawer bottom. In the form just described it will also be understood that the drawer bottom B will be recessed relatively deep at B² to accommodate the sliding inward of the front plate D.

From the foregoing it will now be apparent that the forms of the invention described mount the front plate D on a pivot shaft or axis independent of the tilting front, and in all cases the pivot shaft K for the front plate is mounted in the drawer sides and connected fixedly and slidably with the tilting front by suitable links.

Without further description, it is believed that the construction and operation of the invention will be apparent to those skilled in the art, and it will, of course, be understood that changes may be made within the scope of the appended claims.

I claim:

1. In a filing drawer having a bottom and side walls; a tilting front panel; means, including a first shaft, for pivotally connecting said panel to the drawer bottom; a link having one end connected to said panel and the other end extending rearwardly of the drawer; a second shaft parallel to said first shaft, said second shaft being connected to the said other end of the link, and a spring urged compressor plate pivotally attached to said second shaft; said side walls having open slots therein for releasably supporting said second shaft.

2. In a filing drawer having a bottom and side walls; a tilting front panel; means, including a first shaft, for pivotally connecting said panel to the drawer bottom; a link having one end connected to said panel and the other end extending rearwardly of the drawer; a second shaft parallel to said first shaft, said second shaft being connected to the said other end of the link; a spring urged compressor plate pivotally attached to said second shaft; said side walls having open slots therein for releasably supporting said second shaft; and removable means at the ends of said second shaft for substantially preventing axial displacement thereof relative to the drawer sides.

3. The subject matter as defined by claim 1 in which the first mentioned end of the link is connected to the panel by means pivotally attaching it to the first shaft.

4. The subject matter as defined by claim 1 in which the shafts are disposed in different horizontal planes relative to each other.

5. The subject matter as defined by claim 1 in which the shafts are disposed in substantially the same horizontal plane.

6. The subject matter as defined by claim 1 in which the first mentioned end of the link is pivotally connected to the panel at a point vertically spaced from the first shaft.

7. The subject matter as defined by claim 1 and a third shaft carried by the tilting front panel, said link having its first mentioned end pivotally attached to said third shaft.

CLARENCE W. STRAUBEL.

References Cited in the file of this patent

UNITED STATES PATENTS

| Number | Name | Date |
|---|---|---|
| 2,055,170 | Brainard | Sept. 22, 1936 |
| 2,090,647 | Straubel | Aug. 24, 1937 |